(12) United States Patent
Conrad

(10) Patent No.: US 12,031,650 B2
(45) Date of Patent: Jul. 9, 2024

(54) EXTENDABLE HOSE COUPLER

(71) Applicant: Robert Conrad, Countryside, IL (US)

(72) Inventor: Robert Conrad, Countryside, IL (US)

(73) Assignee: Robert Conrad, Countryside, IL (US)

( * ) Notice: Subject to any disclaimer, the term of this patent is extended or adjusted under 35 U.S.C. 154(b) by 388 days.

(21) Appl. No.: 17/482,069

(22) Filed: Sep. 22, 2021

(65) Prior Publication Data

US 2023/0088892 A1    Mar. 23, 2023

(51) Int. Cl.
  *F16L 27/12*  (2006.01)
  *F16L 33/207*  (2006.01)

(52) U.S. Cl.
  CPC .......... *F16L 27/127* (2019.08); *F16L 33/2071* (2013.01)

(58) Field of Classification Search
  CPC ..... F16L 27/127; F16L 33/2071; F16L 27/12; F16L 27/1275
  USPC ........................................................ 285/302
  See application file for complete search history.

(56) References Cited

U.S. PATENT DOCUMENTS

| | | | | |
|---|---|---|---|---|
| 4,350,372 A * | 9/1982 | Logsdon | ............. | F16L 27/1275 |
| | | | | 285/226 |
| 4,559,783 A * | 12/1985 | Ampferer | ........... | F16L 27/1275 |
| | | | | 60/605.1 |
| 4,650,224 A * | 3/1987 | Smith | ..................... | F16L 27/12 |
| | | | | 285/376 |
| 5,039,137 A * | 8/1991 | Cankovic | .............. | F16L 21/005 |
| | | | | 285/236 |
| 5,323,813 A * | 6/1994 | Barrett | .................... | F16L 27/12 |
| | | | | 138/155 |
| 5,324,001 A * | 6/1994 | Duke | ...................... | F16L 27/12 |
| | | | | 285/236 |
| 5,398,976 A * | 3/1995 | Webb | ...................... | F16L 39/00 |
| | | | | 285/236 |
| 6,394,505 B1 * | 5/2002 | Schmucki | ............... | F16L 25/14 |
| | | | | 285/236 |
| 7,770,941 B2 * | 8/2010 | Ward | .................... | F16L 21/005 |
| | | | | 285/236 |
| 8,297,660 B2 * | 10/2012 | Rosch | ................... | F16L 17/025 |
| | | | | 285/236 |
| 11,447,943 B2 * | 9/2022 | Donnelly | ............ | F16L 27/1275 |
| 2006/0162179 A1 * | 7/2006 | Kong | ..................... | F16L 27/11 |
| | | | | 34/235 |
| 2007/0257488 A1 * | 11/2007 | Jimenez | ................ | F16L 25/065 |
| | | | | 285/302 |

\* cited by examiner

*Primary Examiner* — David Bochna
(74) *Attorney, Agent, or Firm* — McDonnell Boehnen Hulbert & Berghoff LLP

(57) ABSTRACT

An extendable hose coupler having an outer tube having a first end and a second end, and an inner tube having a first end and a second end, wherein the inner tube and first end of the inner tube is positioned within the outer tube, and the inner tube is slidable within the outer tube to provide a varying distance between ends of the inner and outer tubes to provide the extendable hose coupler with an adjustable length, a connector having a first end positioned over an end of the outer tube and a second end positioned over the inner tube, wherein the connector is tightly secured to the inner and outer tubes. A method of providing an extendable hose coupler having a variable length is also provided.

16 Claims, 8 Drawing Sheets

EXTENDABLE HOSE COUPLER

FIELD

The present disclosure relates to the field of providing a hose coupler to couple hoses in an automotive vehicle, or other products having hoses. More particularly, the present disclosure is directed to an extendable hose coupler adapted to provide a hose coupler that can be adjusted to have a varying length.

BACKGROUND

Automotive collision repair often involves replacing/reconstructing components on a front end of a vehicle, including the engine and components within the engine compartment. Often, hoses within the engine compartment are damaged and need to be replaced. Depending on the extent of the damage to the hoses, a length of hosing may need to be replaced, and the length of the hosing can vary in length. Replacing a length of hosing can require cutting a section of hosing to a desired length to replace a damaged length of hosing. Given the positioning of the attachment points for the replacement hosing within the engine compartment, and components therein, including the engine, it can be difficult to properly measure the distance between attachment points to cut a proper length of replacement hosing. If the measurement is wrong, the length of replacement hosing could be cut too short, rendering that length of replacement hosing unusable for that repair.

In view of the foregoing, it would be desirable to provide a length of replacement hosing that is adjustable in length. In addition, it would also be desirable to provide a length of replacement hosing is that is more durable than existing rubber hosing, and that is lightweight.

SUMMARY

The present embodiments advantageously provide a hose coupler that has an adjustable length and is made of a strong and durable material and is lightweight. The extendable hose coupler may advantageously be used in automotive repair applications and serve as a replacement for a damaged length of hosing. The extendable hose coupler may also be used in non-automotive applications to connect hosing in other apparatuses having hosing. The extendable hose coupler includes an inner tube slidable within an outer tube to provide an extendable hose coupler having a variable length. A connector is secured to a first end of the outer tube and includes a tightening mechanism that is secured to the inner tube when the inner tube is in a desired position within the outer tube to provide a desired length between an outer end of the inner tube and an outer end of the outer tube. The use of the extendable hose coupler may be considered a temporary fix, although it does provide for a durable and lasting solution to replacing damaged hosing.

In one aspect, an extendable hose coupler is provided including an outer tube having a first end and a second end, and an inner diameter and an outer diameter, an inner tube having a first end and a second end, and an inner diameter and an outer diameter, wherein the outer diameter of the inner tube is less than the inner diameter of the outer tube, wherein the inner tube and first end of the inner tube is positioned within the outer tube extending through the first end of the outer tube, wherein the inner tube is slidable within the outer tube to provide a varying distance between the second end of the inner tube and the second end of the outer tube, thereby providing the extendable hose coupler with an adjustable length, a first connector having a first end with an inner diameter greater than the outer diameter of the outer tube, the first end of the first connector positioned over the first end of the outer tube and a second end having an inner diameter greater than the outer diameter of the inner tube, the second end of the first connector positioned over the outer diameter of the inner tube, wherein the first connector includes a first tightening mechanism to tightly secure the first end of the first connector to the first end of the outer tube, and a second tightening mechanism to tightly secure the second end of the first connector to the outer diameter of the inner tube, where the first end of the inner tube is positioned in a desired location within the outer tube to provide a desired length between the second end of the inner tube and second end of the outer tube.

In another aspect, a method of (i) providing an extendable hose coupler having a variable length is provided including an outer tube having a first end and a second end, and an inner diameter and an outer diameter, an inner tube having a first end and a second end, and an inner diameter and an outer diameter, wherein the outer diameter of the inner tube is less than the inner diameter of the outer tube, wherein the inner tube and first end of the inner tube is positioned within the outer tube extending through the first end of the outer tube, wherein the inner tube is slidable within the outer tube to provide a varying distance between the second end of the inner tube and the second end of the outer tube, thereby providing the extendable hose coupler with an adjustable length, a first connector having a first end with an inner diameter greater than the outer diameter of the outer tube, the first end of the first connector positioned over the first end of the outer tube and a second end having an inner diameter greater than the outer diameter of the inner tube, the second end of the first connector positioned over the outer diameter of the inner tube, wherein the first connector includes a first tightening mechanism to tightly secure the first end of the first connector to the first end of the outer tube, and a second tightening mechanism to tightly secure the second end of the first connector to the inner tube, where the second end of the inner tube is positioned in a desired location within the outer tube to provide a desired length between the second end of the inner tube and second end of the outer tube; (ii) tightening the first tightening mechanism of the first connector onto the first end of the outer tube; (iii) sliding the inner tube into a desired location within the outer tube; and (iv) tightening the second tightening mechanism of the first connector onto the inner tube.

DETAILED DESCRIPTION

Figure 1:
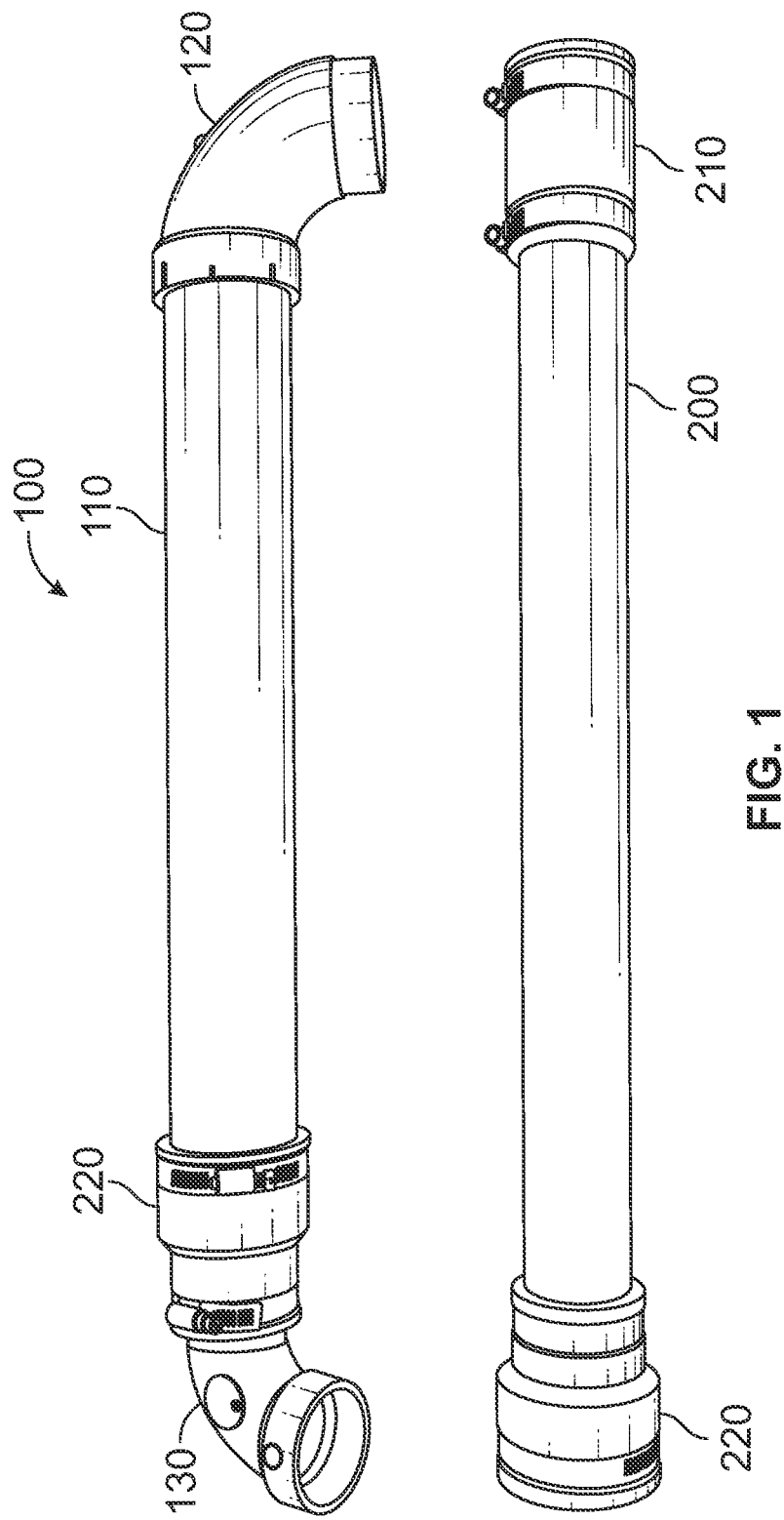
FIG. 1 is a perspective view of extendable hose coupler 100 including outer tube 110 and inner tube 200.

FIG. 1 is a perspective view of extendable hose coupler 100 including outer tube 110 and inner tube 200. In FIG. 1, inner tube 200 is shown separated from outer tube 110. A first connector is shown having a first end positioned over a first end of outer tube 110. First connector 220 has a reduced inner diameter second end into which a first angled hose connector 130 is positioned. The second end of the first angled hose connector 130 is adapted to be secured to a first hose attachment point. A first end of a second angled hose connector 120 is positioned over a second end of outer tube 110, and a second end of the second angled hose connector 120 is adapted to be secured to a second hose attachment point.

Figure 2:
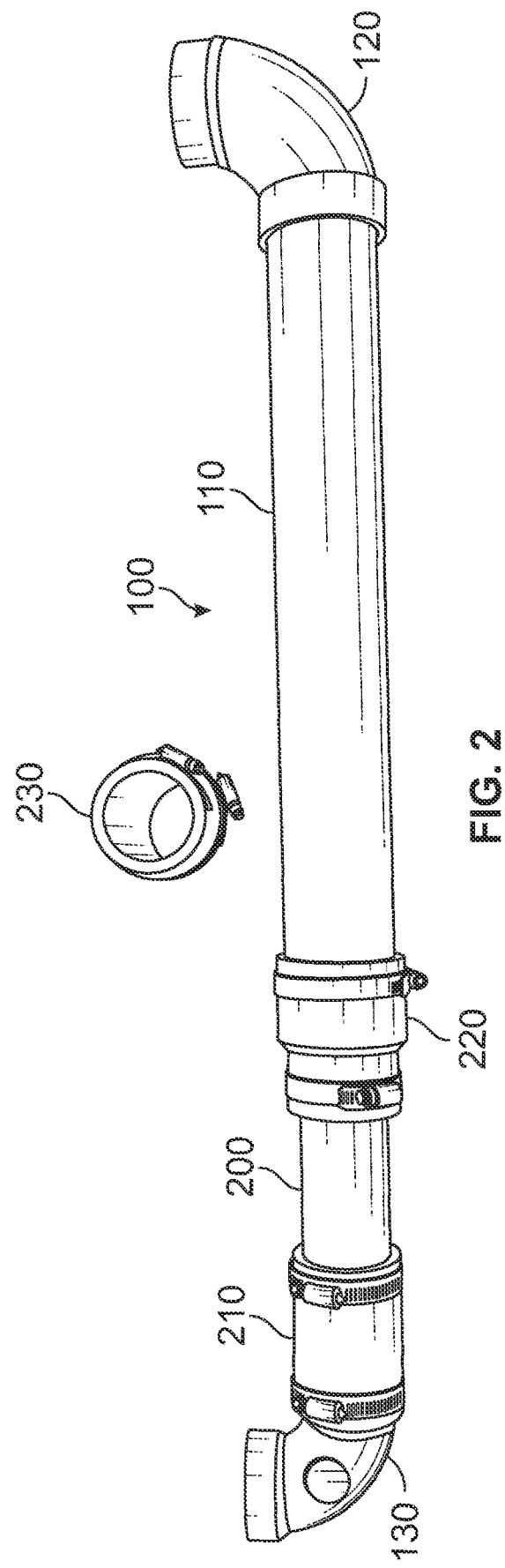
FIG. 2 is a perspective view of extendable hose coupler 100 shown in FIG. 1 with inner tube 200 positioned within outer tube 110.

Inner tube 200 is shown having a second end of first connector 220 positioned over the first end of inner tube 200. A second connector 210 is positioned over a second end of inner tube 200. Second connector 210 is adapted to receive an angled hose connector that will be attached to the first hose attachment point. A third FIG. 2 is a perspective view of extendable hose coupler 100 shown in FIG. 1 with inner tube 200 positioned within outer tube 110. The first connector 220 has an inner diameter that is greater than an outer diameter of outer tube 110 and first connector 220 is positioned over the first end of outer tube 110. First connector 220 includes a first tightening mechanism that is used to tightly secure the first connector 220 to the first end of the outer tube 110. First connector 220 is somewhat flexible to allow the first tightening mechanism to squeeze the first end of first connector 110 onto the first end of the outer tube 110. The inner tube 200 is slidably positioned within outer tube 110. Thus, inner tube 200 has an outer diameter that is less than an inner diameter of outer tube 110. The inner tube 200 may be positioned within the outer tube 100 at a desired distance to provide a desired length of the extendable hose coupler 100. Therefore, the adjustable hose coupler 100 advantageously provides for a variable length extendable hose coupler that can be adjusted in length to accommodate varying distances between hose attachment points within an automotive vehicle, or other apparatuses that include hose attachment points to be connected with a hose coupler.

Once the inner tube 200 is located in a desired position within the outer tube 110, a second tightening mechanism on the second end of first connector 220 is tightened to tightly secure the second end of first connector 220 onto the outer diameter of inner tube 200 to maintain a desired length of the extendable hose connector 100.

A second connector 210 has a first end that is positioned over a second end of the inner tube 200 and a first tightening mechanism is tightened to tightly secure the second connector 210 to the second end of inner tube 200. A first end of an angled hose connector 130 is positioned within a second end of second connector 210 and a second tightening mechanism is tightened to secure the first end of the first hose connector to the second end of the second connector. A second end of angled hose connector 130 is adapted to be secured to a first hose attachment point.

A second angled hose connector 120 has a first end positioned over a second end of outer tube 110. A second end of angled hose connector 120 has a second end that is adapted to be secured to a second hose attachment point. Second angled hose connector 120 could be secured to the second end of the outer tube 110 using a rubber O-ring positioned between an inner surface of the first end of the second angled hose connector 120 and the second end of the outer tube 110. First and second angled hose connectors 130 and 120 are shown with a 90 degree angle between the first and second ends thereof. However, different angles between the first and second connectors may also be used, such as angles between 45-135 degrees, depending on the position of the first and second hose attachment points.

In FIG. 2, the first and second tightening mechanisms on the first connector 220 and second connector 210 are shown as a metal strap, however other tightening mechanisms may also be used including a set screw or other devices for squeezing the ends of the first and second connectors onto the inner tube 200 and outer tube 110 to tightly secure the first connector 220 and second connector 210 onto the inner and outer tubes 110 and 200. The first connector 220 and second connector 210 may be made of rubber, or other flexible materials, to allow the first and second connectors 220 and 210 to be tightly secured to the inner and/or outer tubes 200 and 110. A third connector 230 may be used to secure second hose connector 120 to the second end of the outer tube.

Figure 3:
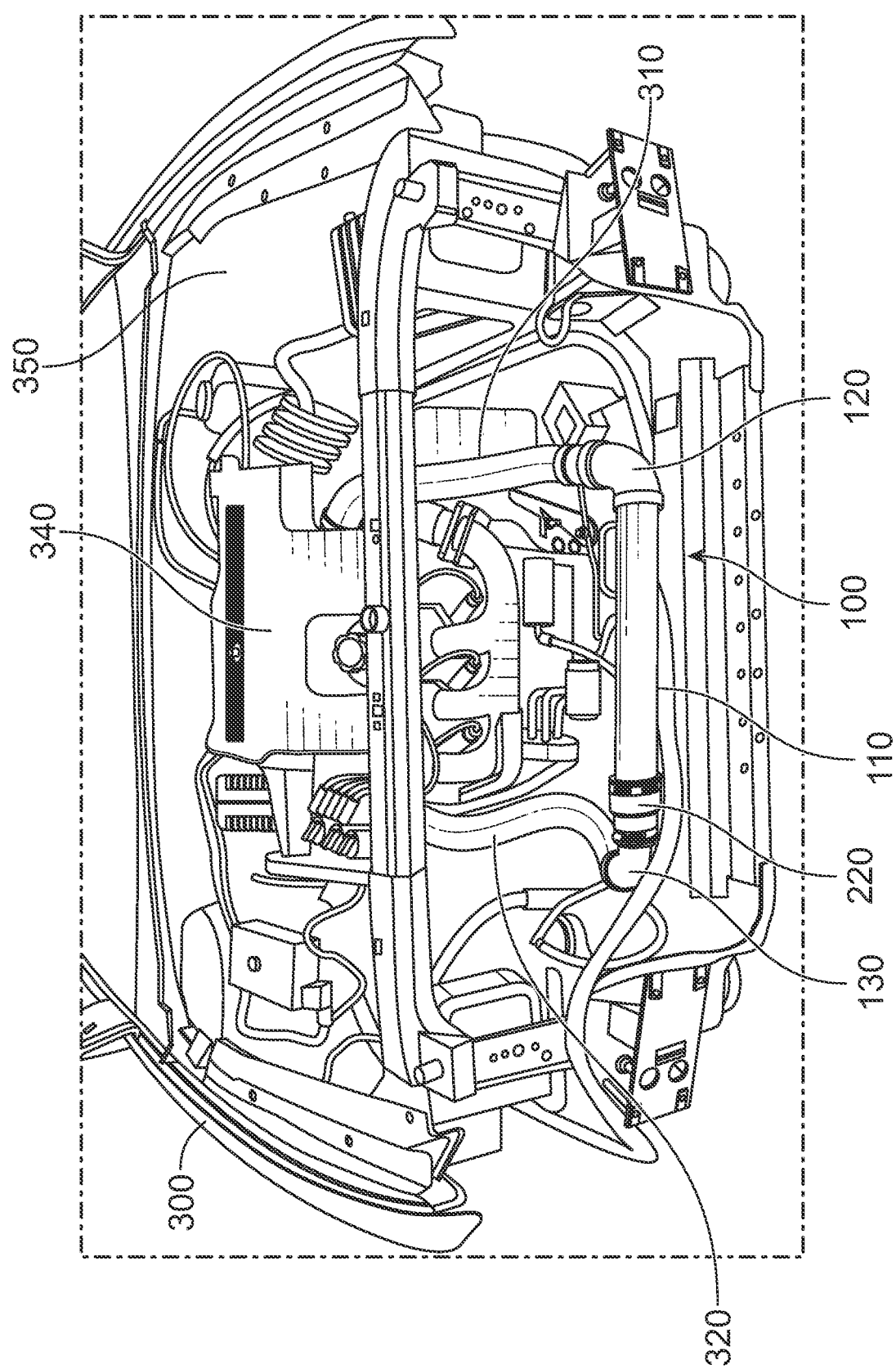
FIG. 3 is a perspective view of extendable hose coupler 100 positioned in an engine compartment in a horizontal orientation.

FIG. 3 is a perspective view of extendable hose coupler 100 positioned in an engine compartment 350 of an automotive vehicle 300 having engine 340. First hose connector 130 is attached to a first hose attachment point on hose 320 and second hose connector 120 is attached to a second hose attachment point on hose 310.

Figure 4:
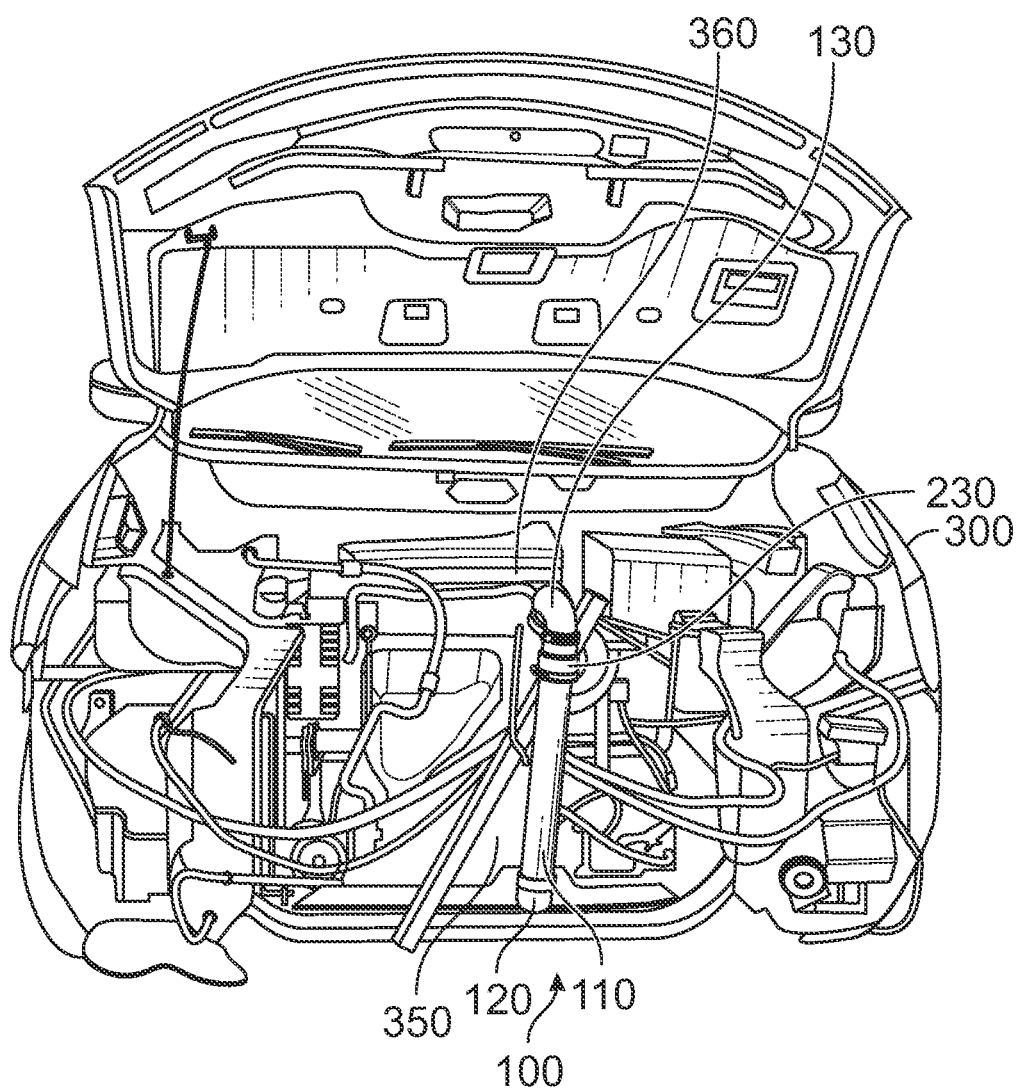
FIG. 4 is a perspective view of extendable hose coupler 100 positioned in an engine compartment in a vertical orientation.

FIG. 4 is a perspective view of extendable hose coupler 100 positioned in an engine compartment 350 of automotive vehicle 300 having an engine 360 in a vertical orientation.

Figure 5:
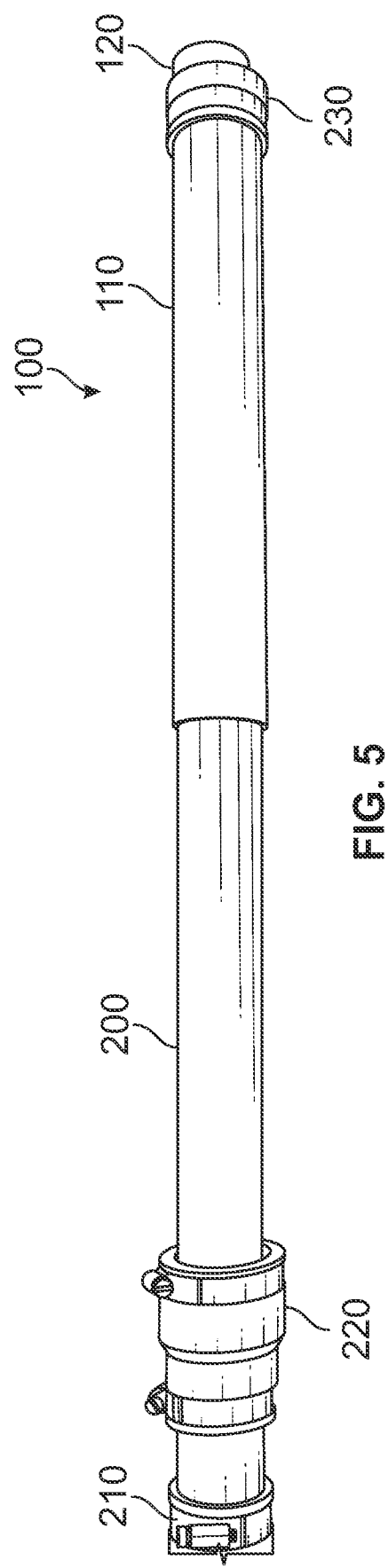
FIG. 5 is a perspective view of extendable hose coupler 100 shown in FIG. 1 with inner tube 200 positioned within outer tube 110 and first connector 220 positioned over inner tube 200.

FIG. 5 is a perspective view of extendable hose coupler 100 shown in FIG. 1 with inner tube 200 positioned within outer tube 110 and first connector 220 positioned over inner tube 200. A second connector 210 is positioned over the second end of inner tube 200. First connector 220 is positioned over inner tube 200 and may be slid into position such that the first end of first connector 220 may be positioned over the first end of outer tube 110. A first end of an adjuster 230 is positioned over the second end of outer tube 110. Adjuster 230 includes a second end having a reduced outer diameter which may be attached to an angled hose connector.

Figure 6:
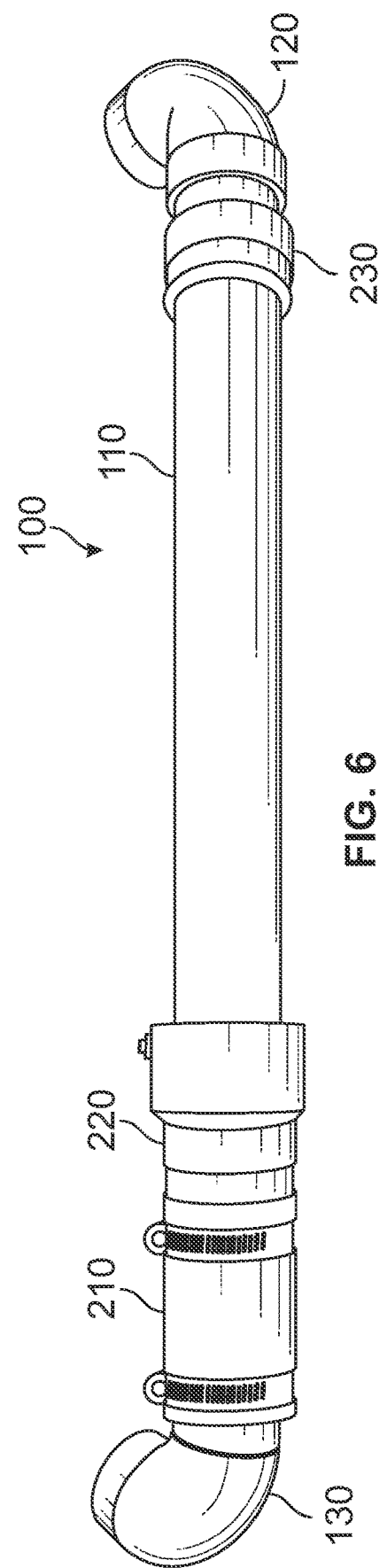
FIG. 6 is a perspective view of extendable hose coupler 100 with angled hose connectors 120 and 130 positioned thereon.

FIG. 6 is a perspective view of extendable hose coupler 100 with angled hose connectors 120 and 130 positioned on ends thereof. In FIG. 6, first connector 220 is positioned over a first end of outer tube 110. Second connector 210 is positioned over a second end of inner tube 200. First angled hose connector 130 is positioned within the second end of second connector 210. Adjuster 230 is positioned over second end of outer tube 110 and a second angled hose connector 120 is positioned over the second end of adjuster 230. In FIG. 6, the extendable hose coupler 100 is shown with its shortest length as second connector 210 abuts the second end of first connector 220.

Figure 7:
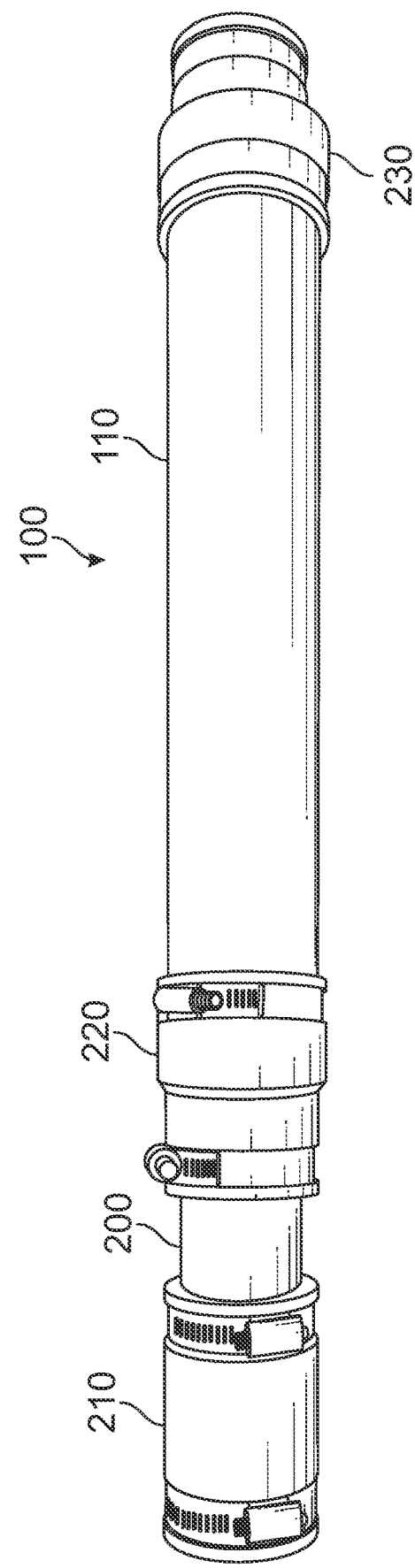
FIG. 7 is a perspective view of extendable hose coupler 100 with a second connector 210 secured to inner tube 200.

FIG. 7 is a perspective view of extendable hose coupler 100 shown in FIG. 1 with inner tube 200 positioned within outer tube 110 and first connector 220 positioned over inner tube 200 with the first end of first connector 220 positioned over the first end of outer tube 110. A second connector 210 is positioned over the second end of inner tube 200. A first end of an adjuster 230 is positioned over the second end of outer tube 110. Adjuster 230 includes a second end having a reduced outer diameter which may be attached to an angled hose connector. Second end of second connector 210 is shown positioned over the second end of inner tube 200.

Figure 8:
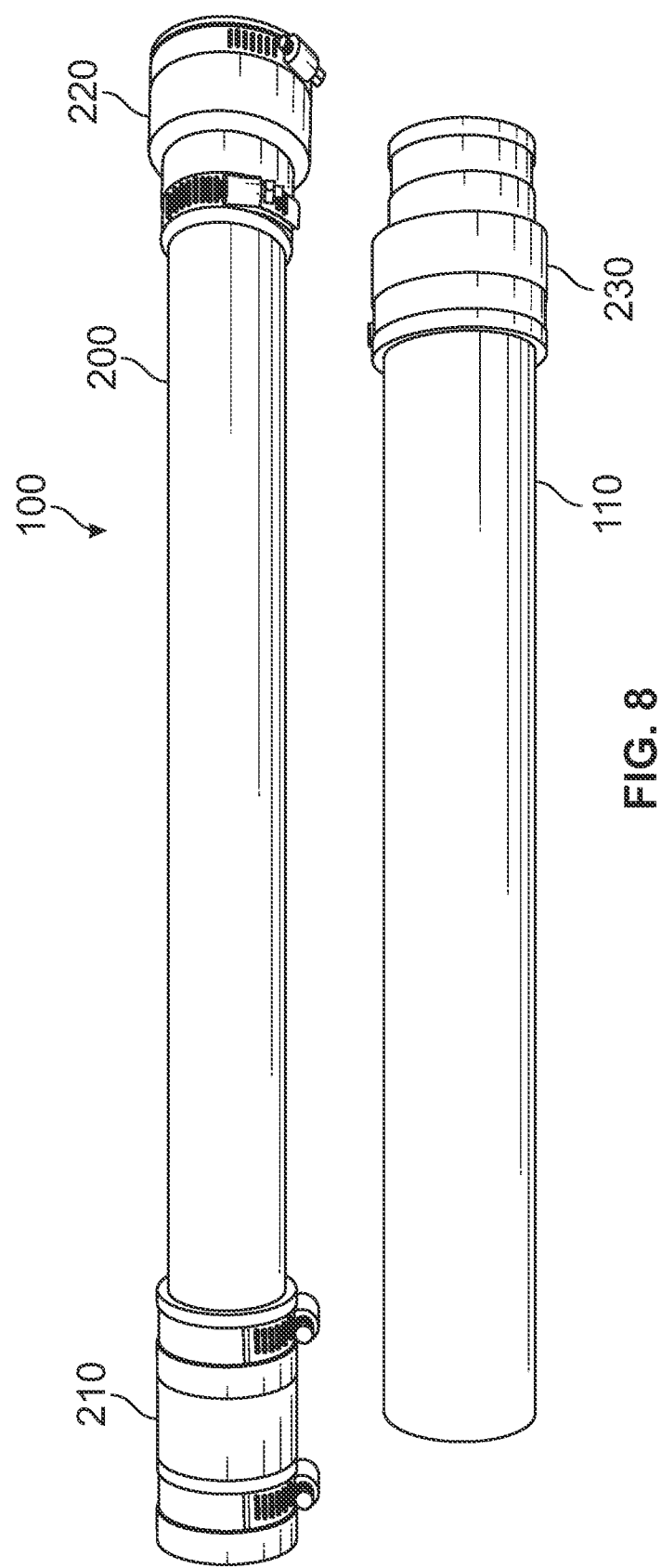
FIG. 8 is a perspective view of extendable hose coupler 100 with inner tube 200 separated from outer tube 110.

FIG. 8 is a perspective view of extendable hose coupler 100 with inner tube 200 separated from outer tube 110. Second end of first connector 220 is shown positioned over the first end of inner tube 200. First end of second connector 210 is shown positioned over the second end of inner tube 200. Adjuster 230 is shown with a first end thereof positioned over the second end of outer tube 110. The extendable hose coupler 10 may be attached to hoses using the following method: (i) providing an extendable hose coupler having an outer tube having a first end and a second end, and an inner diameter and an outer diameter, an inner tube having a first end and a second end, and an inner diameter and an outer diameter, wherein the outer diameter of the inner tube is less than the inner diameter of the outer tube, wherein the inner tube and first end of the inner tube is positioned within the outer tube extending through the first end of the outer tube, wherein the inner tube is slidable within the outer tube to provide a varying distance between the second end of the inner tube and the second end of the outer tube, thereby providing the extendable hose coupler with an adjustable length, a first connector having a first end with an inner diameter greater than the outer diameter of the outer tube, the first end of the first connector positioned over the first end of the outer tube and a second end having an inner diameter greater than the outer diameter of the inner tube, the second end of the first connector positioned over the outer diameter of the inner tube, wherein the first connector includes a first tightening mechanism to tightly secure the first end of the first connector to the first end of the outer tube, and a second tightening mechanism to tightly secure the second end of the first connector to the inner tube, where the second end of the inner tube is positioned in a desired location within the outer tube to provide a desired length between the second end of the inner tube and second end of the outer tube; (ii) tightening the first tightening mechanism of the first connector onto the first end of the outer tube; (iii) sliding the inner tube into a desired location within the outer tube; and (iv) tightening the second tightening mechanism of the first connector onto the inner tube.

The method may further include (v) positioning a first end of a second connector having an inner diameter greater than the outer diameter of the inner tube over the second end of the inner tube; (vi) wherein the second connector has a first tightening mechanism to tightly secure the first end of the second connector to the second end of the inner tube; (vii) wherein the second connector has a second tightening mechanism adapted to secure a second end of the second connector to a first angled hose connector having a first end with an outer diameter less than an inner diameter of the second connector; (viii) securing the first angled hose connector to the second end of the second connector; (ix) positioning a second angled hose connector, directly or indirectly, on the second end of the outer tube; (x) securing a second end of the first angled hose connector to a first hose attachment point; and (xi) securing the second angled hose connector to a second hose attachment point.

It will be appreciated that the order of the steps of the method described above and set forth in the claims may vary.

In addition, the outer tube may have an inner diameter of 2" and the inner tube an outer diameter of 1.75" although other diameters may be used for the outer and inner tubes.

I claim:

1. An extendable hose coupler comprising:
an outer tube having a first end and a second end, and an inner diameter and an outer diameter;
an inner tube having a first end and a second end, and an inner diameter and an outer diameter;
wherein the outer diameter of the inner tube is less than the inner diameter of the outer tube;
wherein a first end of the inner tube is positioned within the outer tube;
wherein the inner tube extends through the first end of the outer tube;
wherein the inner tube is slidable within the outer tube to provide a varying distance between the second end of the inner tube and the second end of the outer tube, thereby providing the extendable hose coupler with an adjustable length;
a first connector having a first end with an inner diameter greater than the outer diameter of the outer tube, the first end of the first connector positioned over the first end of the outer tube and a second end having an inner diameter greater than the outer diameter of the inner tube, the second end of the first connector positioned over the outer diameter of the inner tube;
wherein the first connector includes a first tightening mechanism to tightly secure the first end of the first connector to the first end of the outer tube, and a second tightening mechanism to tightly secure the second end of the first connector to the outer diameter of the inner tube, where the first end of the inner tube is positioned in a desired location within the outer tube to provide a desired length between the second end of the inner tube and second end of the outer tube;
a second connector having an inner diameter greater than the outer diameter of the inner tube, the second connector positioned over the second end of the inner tube;
wherein the second connector has a first tightening mechanism to tightly secure the second connector to the second end of the inner tube;
wherein the second connector has a second tightening mechanism adapted to secure the second connector to a first angled hose connector having a first end with an outer diameter less than an inner diameter of the second connector;
wherein the first end of the first angled hose connector is secured to an end of the second connector;
a second angled hose connector positioned, directly or indirectly, on the second end of the outer tube;
wherein a second end of the first angled hose connector is configured to be secured to a first hose attachment point; and
wherein the second angled hose connector is configured to be secured to a second hose attachment point.

2. The extendable hose coupler of claim 1, including a third connector adapted to attach the second angled hose connector to the second end of the outer tube.

3. The extendable hose coupler of claim 1, wherein the first end of the second connector is positioned over the second end of the inner tube, and the second tightening mechanism of the second connector is tightened to secure the second end of the inner tube to the first end of the second connector.

4. The extendable hose coupler of claim 3, wherein a third connector having an inner diameter greater than the outer diameter of the outer tube is positioned over the second end of the outer tube.

5. The extendable hose coupler of claim 4, wherein the first and second angled hose connectors are angled at a 90 degree angle.

6. The extendable hose coupler of claim 1, wherein an adjuster having a first end with an inner diameter greater than an outer diameter of the outer tube is positioned over the second end of the outer tube; and wherein a second end of the adjuster is adapted to be coupled to the second angled hose connector.

7. The extendable hose coupler of claim 1, wherein the first connector has a first end positioned within the second end of the second connector and the second tightening mechanism of the second connector is tightened to secure the second connector to the second end of the first connector.

8. The extendable hose coupler of claim 1, wherein the inner and outer tubes have inner and outer diameters having a circular cross section.

9. The extendable hose coupler of claim 1, wherein the inner tube and outer tube are made of polyvinyl chloride (PVC).

10. The extendable hose coupler of claim 1, wherein a first end of a third connector is positioned over the second end of the outer tube, wherein the first end of the third connector includes a first tightening mechanism to tightly secure the first end of the third connector to the second end of the outer tube, and wherein a second end of the third connector includes a second tightening mechanism to secure the third connector to an angled hose connector.

11. A method comprising:

providing an extendable hose coupler having an outer tube having a first end and a second end, and an inner diameter and an outer diameter, an inner tube having a first end and a second end, and an inner diameter and an outer diameter, wherein the outer diameter of the inner tube is less than the inner diameter of the outer tube, wherein a first end of the inner tube is positioned within the outer tube, wherein the inner tube extends through the first end of the outer tube, wherein the inner tube is slidable within the outer tube to provide a varying distance between the second end of the inner tube and the second end of the outer tube, thereby providing the extendable hose coupler with an adjustable length, a first connector having a first end with an inner diameter greater than the outer diameter of the outer tube, the first end of the first connector positioned over the first end of the outer tube and a second end having an inner diameter greater than the outer diameter of the inner tube, the second end of the first connector positioned over the outer diameter of the inner tube, wherein the first connector includes a first tightening mechanism to tightly secure the first end of the first connector to the first end of the outer tube, and a second tightening mechanism to tightly secure the second end of the first connector to the inner tube, where the second end of the inner tube is positioned in a desired location within the outer tube to provide a desired length between the second end of the inner tube and second end of the outer tube;

tightening the first tightening mechanism of the first connector onto the first end of the outer tube;

sliding the inner tube into a desired location within the outer tube;

tightening the second tightening mechanism of the first connector onto the inner tube;

positioning a first end of a second connector having an inner diameter greater than the outer diameter of the inner tube over the second end of the inner tube, wherein the second connector has a first tightening mechanism to tightly secure the first end of the second connector to the second end of the inner tube, and wherein the second connector has a second tightening mechanism adapted to secure a second end of the second connector to a first angled hose connector having a first end with an outer diameter less than an inner diameter of the second connector;

securing the first angled hose connector to the second end of the second connector;

positioning a second angled hose connector, directly or indirectly, on the second end of the outer tube;

securing a second end of the first angled hose connector to a first hose attachment point; and securing an end of the second angled hose connector to a second hose attachment point.

12. The method of claim 11, further including a third connector adapted to attach the second angled hose connector to the second end of the outer tube.

13. The method of claim 11, wherein the first and second hose attachment points are positioned within an engine compartment.

14. The method of claim 11, wherein the first and second angled hose connectors are angled at a 90 degree angle.

15. The method of claim 11, wherein the inner tube and outer tube are made of a polyvinyl chloride (PVC).

16. The method of claim 11, wherein a first end of a third connector is positioned over the second end of the outer tube, wherein the first end of the third connector includes a first tightening mechanism to tightly secure the first end of the third connector to the second end of the outer tube, and wherein a second end of the third connector includes a second tightening mechanism to secure the third connector to the second angled hose connector.

* * * * *